US 9,162,558 B2

(12) United States Patent
Stenberg et al.

(10) Patent No.: US 9,162,558 B2
(45) Date of Patent: Oct. 20, 2015

(54) ELECTRIC VEHICLE

(75) Inventors: Kurt E. Stenberg, Greenbush, MN (US); Joel M. Notaro, North Branch, MN (US); Josh J. Leonard, Blaine, MN (US); Stephen G. Crain, Hudson, WI (US); Dennis P. Sabourin, Roseau, MN (US); Russ G. Olsen, Taylors Falls, MN (US); Cory A. Wimpfheimer, Greenbush, MN (US)

(73) Assignee: Polaris Industries Inc., Medina, MN (US)

( * ) Notice: Subject to any disclaimer, the term of this patent is extended or adjusted under 35 U.S.C. 154(b) by 1690 days.

(21) Appl. No.: 12/484,921

(22) Filed: Jun. 15, 2009

(65) Prior Publication Data

US 2010/0314184 A1    Dec. 16, 2010

Related U.S. Application Data

(60) Provisional application No. 61/187,147, filed on Jun. 15, 2009.

(51) Int. Cl.
*B60K 1/04* (2006.01)
*B60K 17/16* (2006.01)
(Continued)

(52) U.S. Cl.
CPC .............. *B60K 1/04* (2013.01); *B60K 17/346* (2013.01); *B60K 17/356* (2013.01); *B60L 7/12* (2013.01); *B60L 11/126* (2013.01); *B60L 11/1816* (2013.01); *B60L 11/1864* (2013.01); *B60L 11/1868* (2013.01); *B60L 11/1877* (2013.01); *B60K 6/52* (2013.01); *B60L 2200/22* (2013.01); *B60L 2210/12* (2013.01); *B60L 2240/12* (2013.01); *B60L 2240/36* (2013.01); *B60L 2240/423* (2013.01); *B60L 2240/425* (2013.01); *B60L 2260/28* (2013.01); *Y02T 10/6217* (2013.01); *Y02T 10/6265* (2013.01); *Y02T 10/642* (2013.01); *Y02T 10/7005* (2013.01); *Y02T 10/7061* (2013.01); *Y02T 10/7066* (2013.01); *Y02T 10/7077* (2013.01); *Y02T 10/7233* (2013.01); *Y02T 90/127* (2013.01);
(Continued)

(58) Field of Classification Search
USPC .......... 180/58, 60, 68.5, 291, 65.1, 233, 242, 180/245, 246, 248
See application file for complete search history.

(56) References Cited

U.S. PATENT DOCUMENTS 1,138,122 A * 5/1915 Lambert et al. .............. 180/68.5
1,551,594 A * 9/1925 Walter ......................... 180/65.1
(Continued)

FOREIGN PATENT DOCUMENTS

CN    201211849 Y    3/2009
EP    1205331 A2    5/2002

OTHER PUBLICATIONS

European Patent Office, International Search Report for PCT/US2010/038711, mailed on Apr. 6, 2011, 6 pages.
(Continued)

*Primary Examiner* — Paul N Dickson
*Assistant Examiner* — Steve Clemmons
(74) *Attorney, Agent, or Firm* — Faegre Baker Daniels LLP

(57) ABSTRACT

A utility vehicle is disclosed having an electric drive. The drivetrain is comprised of batteries, a motor, a transaxle driven by the motor, a rear differential driven by the transaxle, and a prop shaft which is driven by the transaxle and drives a front differential. The batteries are provided in two groups and are supported on the frame of the vehicle.

21 Claims, 18 Drawing Sheets

(51) Int. Cl.
  *B60K 17/346* (2006.01)
  *B60K 17/356* (2006.01)
  *B60L 7/12* (2006.01)
  *B60L 11/18* (2006.01)
  *B60L 11/12* (2006.01)
  *B60K 6/52* (2007.10)

(52) U.S. Cl.
  CPC ............... *Y02T 90/14* (2013.01); *Y10T 477/30* (2015.01); *Y10T 477/32* (2015.01); *Y10T 477/322* (2015.01); *Y10T 477/3225* (2015.01)

(56) References Cited

U.S. PATENT DOCUMENTS

| | | | |
|---|---|---|---|
| 3,294,190 A | 12/1966 | Tosun Suvor et al. | |
| 3,708,028 A * | 1/1973 | Hafer | 180/65.1 |
| 3,874,472 A | 4/1975 | Deane | |
| 4,042,054 A | 8/1977 | Ward | |
| 4,254,843 A | 3/1981 | Han et al. | |
| 4,388,583 A | 6/1983 | Krueger | |
| 4,405,028 A | 9/1983 | Price | |
| 4,405,029 A | 9/1983 | Hunt | |
| 4,602,694 A | 7/1986 | Weldin | |
| 4,697,660 A | 10/1987 | Wu et al. | |
| 5,036,939 A | 8/1991 | Johnson | |
| 5,148,883 A | 9/1992 | Tanaka et al. | |
| 5,251,721 A | 10/1993 | Ortenheim | |
| 5,341,280 A | 8/1994 | Divan et al. | |
| 5,422,822 A | 6/1995 | Toyota et al. | |
| 5,586,613 A | 12/1996 | Ehsani | |
| 5,804,935 A | 9/1998 | Radev | |
| 5,960,901 A | 10/1999 | Hanagan | |
| 6,019,183 A | 2/2000 | Shimasaki et al. | |
| 6,041,877 A | 3/2000 | Yamada et al. | |
| 6,332,504 B1 * | 12/2001 | Adds | 180/65.25 |
| 6,334,364 B1 | 1/2002 | Suzuki | |
| 6,427,797 B1 | 8/2002 | Chang | |
| RE38,012 E | 3/2003 | Ochab | |
| 6,837,325 B2 * | 1/2005 | Shimizu | 180/68.5 |
| 6,930,405 B2 | 8/2005 | Gunji | |
| 6,954,045 B2 | 10/2005 | Nishikawa et al. | |
| 7,036,616 B1 | 5/2006 | Kejha | |
| 7,055,454 B1 | 6/2006 | Whiting | |
| 7,108,091 B2 | 9/2006 | Guidry et al. | |
| 7,134,517 B1 | 11/2006 | Kaiser | |
| 7,216,943 B2 | 5/2007 | Nishikawa et al. | |
| 7,258,183 B2 | 8/2007 | Leonardi et al. | |
| 7,380,621 B2 | 6/2008 | Yoshida | |
| 7,389,837 B2 | 6/2008 | Tamai et al. | |
| 7,472,766 B2 | 1/2009 | Yamamoto et al. | |
| 7,497,285 B1 | 3/2009 | Radev | |
| 7,560,882 B2 | 7/2009 | Clark | |
| 7,715,968 B2 | 5/2010 | Mori | |
| 7,740,092 B2 | 6/2010 | Bender | |
| 7,747,363 B1 | 6/2010 | Tang | |
| 7,775,311 B1 * | 8/2010 | Hardy et al. | 180/68.5 |
| 7,832,513 B2 | 11/2010 | Verbrugge et al. | |
| 7,834,582 B2 | 11/2010 | Luan et al. | |
| 7,913,782 B1 | 3/2011 | Foss | |
| 7,921,945 B2 | 4/2011 | Harris | |
| 7,994,745 B2 | 8/2011 | Fujino et al. | |
| 8,011,461 B2 | 9/2011 | Rodriguez et al. | |
| 8,035,247 B2 | 10/2011 | Ichikawa | |
| 8,039,976 B2 | 10/2011 | Sato et al. | |
| 8,042,993 B2 | 10/2011 | Van Maanen | |
| 2002/0074177 A1 * | 6/2002 | Pasquini et al. | 180/233 |
| 2002/0094908 A1 | 7/2002 | Urasawa et al. | |
| 2002/0104704 A1 | 8/2002 | Chang | |
| 2003/0162631 A1 | 8/2003 | Williams | |
| 2004/0079569 A1 * | 4/2004 | Awakawa | 180/68.5 |
| 2004/0134698 A1 | 7/2004 | Yamamoto et al. | |
| 2005/0115748 A1 | 6/2005 | Lanier | |
| 2005/0279539 A1 * | 12/2005 | Chiou et al. | 180/65.1 |
| 2006/0027618 A1 | 2/2006 | Williams | |
| 2006/0066106 A1 | 3/2006 | Yang et al. | |
| 2006/0162973 A1 | 7/2006 | Harris et al. | |
| 2006/0231304 A1 | 10/2006 | Severinsky et al. | |
| 2007/0050095 A1 | 3/2007 | Nelson | |
| 2007/0114080 A1 | 5/2007 | Kaiser et al. | |
| 2007/0114081 A1 | 5/2007 | Iwanaka et al. | |
| 2007/0251742 A1 | 11/2007 | Adams et al. | |
| 2007/0259747 A1 | 11/2007 | Thomas et al. | |
| 2008/0060866 A1 * | 3/2008 | Worman | 180/233 |
| 2008/0121443 A1 | 5/2008 | Clark et al. | |
| 2008/0185199 A1 | 8/2008 | Kimura et al. | |
| 2008/0236920 A1 | 10/2008 | Swindell et al. | |
| 2008/0308334 A1 | 12/2008 | Leonard | |
| 2009/0000849 A1 | 1/2009 | Leonard | |
| 2009/0014223 A1 | 1/2009 | Jones et al. | |
| 2009/0065279 A1 * | 3/2009 | Bessho et al. | 180/242 |
| 2009/0071737 A1 | 3/2009 | Leonard | |
| 2009/0071739 A1 | 3/2009 | Leonard | |
| 2009/0079384 A1 | 3/2009 | Harris | |
| 2009/0090573 A1 | 4/2009 | Boone | |
| 2009/0091101 A1 | 4/2009 | Leonard | |
| 2009/0121518 A1 | 5/2009 | Leonard | |
| 2009/0143929 A1 | 6/2009 | Eberhard et al. | |
| 2009/0177345 A1 | 7/2009 | Severinsky et al. | |
| 2009/0183938 A1 * | 7/2009 | Cover et al. | 180/291 |
| 2009/0301830 A1 | 12/2009 | Kinsman | |
| 2009/0302590 A1 | 12/2009 | Van Bronkhorst | |
| 2010/0012412 A1 | 1/2010 | Deckard | |
| 2010/0060015 A1 | 3/2010 | Buker | |
| 2010/0065344 A1 | 3/2010 | Collings, III | |
| 2010/0090657 A1 | 4/2010 | Fazakas | |
| 2010/0090797 A1 | 4/2010 | Koenig | |
| 2010/0096199 A1 | 4/2010 | Raynor | |
| 2010/0131134 A1 | 5/2010 | Wallace | |
| 2010/0155170 A1 | 6/2010 | Melvin | |
| 2010/0314182 A1 | 12/2010 | Crain et al. | |
| 2010/0314183 A1 | 12/2010 | Olsen et al. | |
| 2010/0314184 A1 | 12/2010 | Stenberg et al. | |
| 2010/0317484 A1 | 12/2010 | Gillingham et al. | |
| 2010/0317485 A1 | 12/2010 | Gillingham et al. | |
| 2010/0320959 A1 | 12/2010 | Tomberlin et al. | |
| 2011/0036658 A1 | 2/2011 | Cantemir et al. | |
| 2011/0048821 A1 | 3/2011 | Dial | |
| 2011/0061961 A1 | 3/2011 | Liu et al. | |
| 2011/0139521 A1 * | 6/2011 | Ichikawa | 180/65.1 |
| 2011/0148184 A1 | 6/2011 | Suzuki et al. | |
| 2011/0174561 A1 | 7/2011 | Bowman | |
| 2011/0226539 A1 | 9/2011 | Huss et al. | |

OTHER PUBLICATIONS

European Patent Office, Written Opinion of the International Searching Authority for PCT/US2010/038711, mailed on Apr. 6, 2011, 8 pages.

Photograph of Bad Boy buggies® All Electric 4WD vehicle, 1 page. Undated.

Photograph of Ruff & Tuff vehicle, 1 page. Undated.

All-Terrain Vehicles Magazine, "Bad Boy Partners with G-Force on Project," Jan. 29, 2009, 2 pages, available at http://www.atvmag.com/article.asp?nid=1324, accessed on Jun. 11, 2010.

Trombetta Tympanium, "Bear DC Contractor Specifications," 2003, 2 pages, available at www.trombetta.com.

* cited by examiner

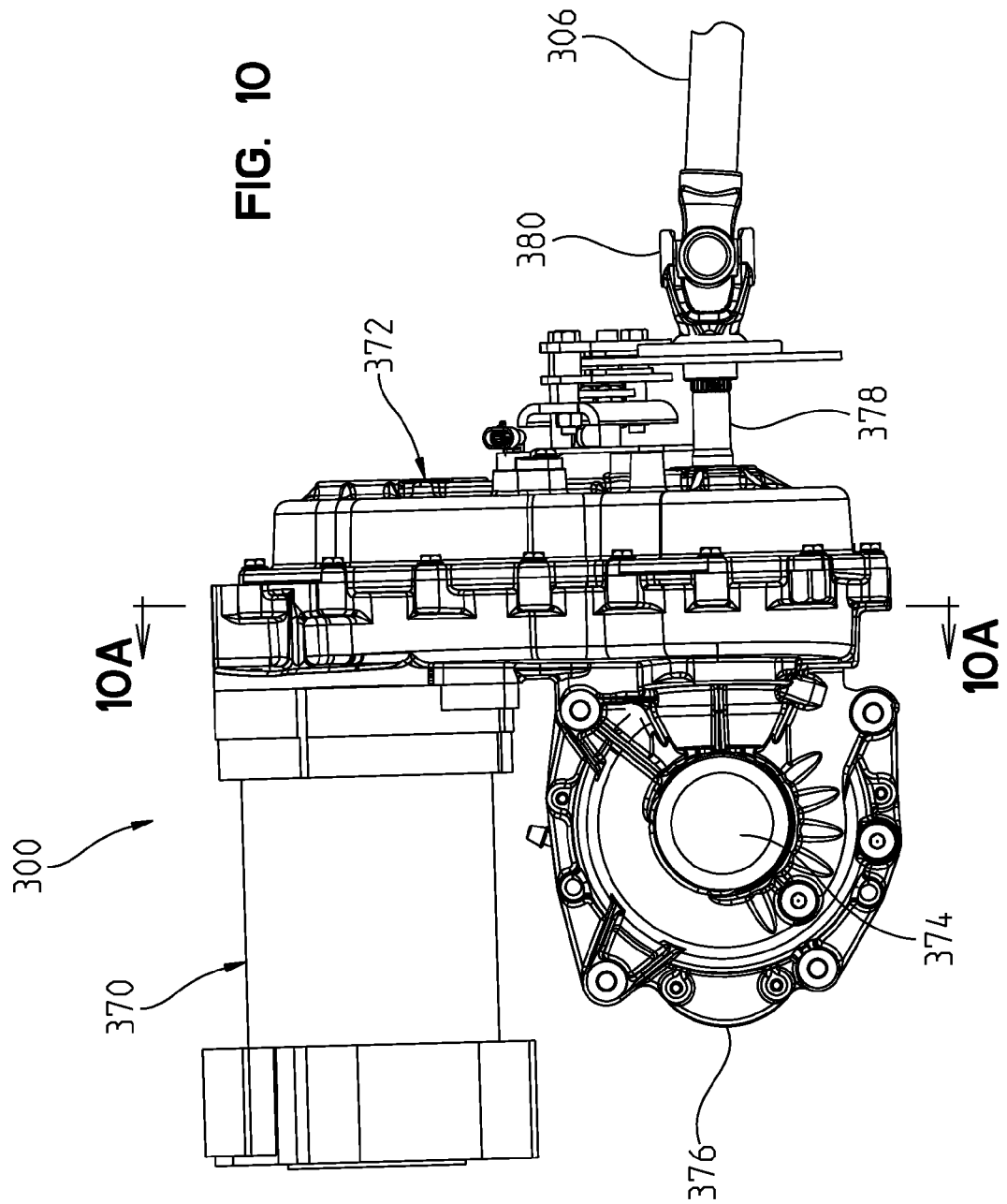

ELECTRIC VEHICLE

RELATED APPLICATIONS

Reference is made to our co-pending, concurrently filed provisional application, Ser. No. 61/187,147, the subject matter of which is incorporated herein by reference.

BACKGROUND

The present invention relates generally to a drive system for a vehicle and in particular to an electric vehicle.

SUMMARY

The present disclosure relates to vehicles, including utility vehicles. The present disclosure relates to utility vehicles having an electric drive train, and more particularly to battery operated four wheel drive vehicles.

In an exemplary embodiment of the present disclosure, a utility vehicle is provided comprising a frame having first and second ends and a seat supporting portion therebetween. A plurality of ground engaging members support the frame. A plurality of batteries are supported by the frame intermediate the first and second ends and are divided into a plurality of groups of batteries leaving at least one longitudinal opening therebetween. An electronic controller is mounted transversely in the longitudinal opening. A first differential is supported by the frame adjacent the first end and a second differential supported by the frame adjacent the second end. An electric motor is supported by the frame adjacent the first end and operatively connected to the first differential. A prop shaft is operatively connected to the motor and extends through the longitudinal opening and is operatively connected to the second differential.

In another exemplary embodiment of the present disclosure, a utility vehicle is provided comprising a frame having a front end and a rear end; a plurality of batteries supported by the frame; an electric motor mounted adjacent a rear end of the frame; a rear differential mounted adjacent a rear end of the frame and operatively connected to the electric motor; and a front differential and overrunning clutch operatively connected to the electric motor.

In a further exemplary embodiment of the present disclosure, a vehicle is provided comprising a frame having first and second ends; a plurality of ground engaging members supporting the frame; first and second drive linkages positioned proximate the first and second ends and operatively connected to ground engaging members at the first and second ends; a motor attached to the frame first end and operatively connected to the first and second drive linkages; and a plurality of batteries supported by the frame intermediate the first and second ends, the batteries defining a plurality of groups of batteries electrically connected in parallel and the individual batteries within each group being electrically connected in series.

In yet still another exemplary embodiment of the present disclosure, a utility vehicle comprises a frame having first and second ends and a seat supporting portion therebetween; a plurality of batteries supported by the frame intermediate the first and second ends and divided into a plurality of groups of batteries leaving at least one longitudinal opening therebetween; an electronic controller supported by the frame and extending transversely into the longitudinal opening; an electric motor supported by the frame adjacent to the first end; and electrical couplings, coupling the batteries to the electronic controller, and the electronic controller to the motor, wherein all of the electrical connections to and from the electronic controller are made to one face of the electronic controller.

In yet still a further exemplary embodiment of the present disclosure, a utility vehicle is provided comprising a frame having first and second ends; a seat supporting portion supported by the frame having a front and rear end; a plurality of batteries supported by the frame rearward of the seat supporting portion front end; an electronic controller supported by the frame; an electric motor supported by the frame adjacent the first end; at least one charging unit supported by the frame forward of the seat supporting portion front end; and electrical couplings, coupling the batteries to the electronic controller, the electronic controller to the motor, and the charging unit to the plurality of batteries.

In yet another exemplary embodiment of the present disclosure, a utility vehicle is provided comprising a frame having front and rear ends; a plurality of ground engaging members supporting the frame; a front drive linkage supported by the frame and positioned adjacent the frame front end; a rear drive linkage supported by the frame and positioned adjacent the frame rear end; a plurality of batteries supported by the frame; an AC electric motor supported by the frame and mounted adjacent to the rear end, the motor being operatively connected to the front and rear drive linkages; an electronic controller; and electrical couplings, coupling the batteries to the electronic controller and the electronic controller to the motor.

The above mentioned and other features of the invention, and the manner of attaining them, will become more apparent and the invention itself will be better understood by reference to the following description of embodiments of the invention taken in conjunction with the accompanying drawings.

BRIEF DESCRIPTION OF THE DRAWINGS

FIG. 10 shows a side view of the rear portion of the drivetrain;

DETAILED DESCRIPTION

Figure 1:
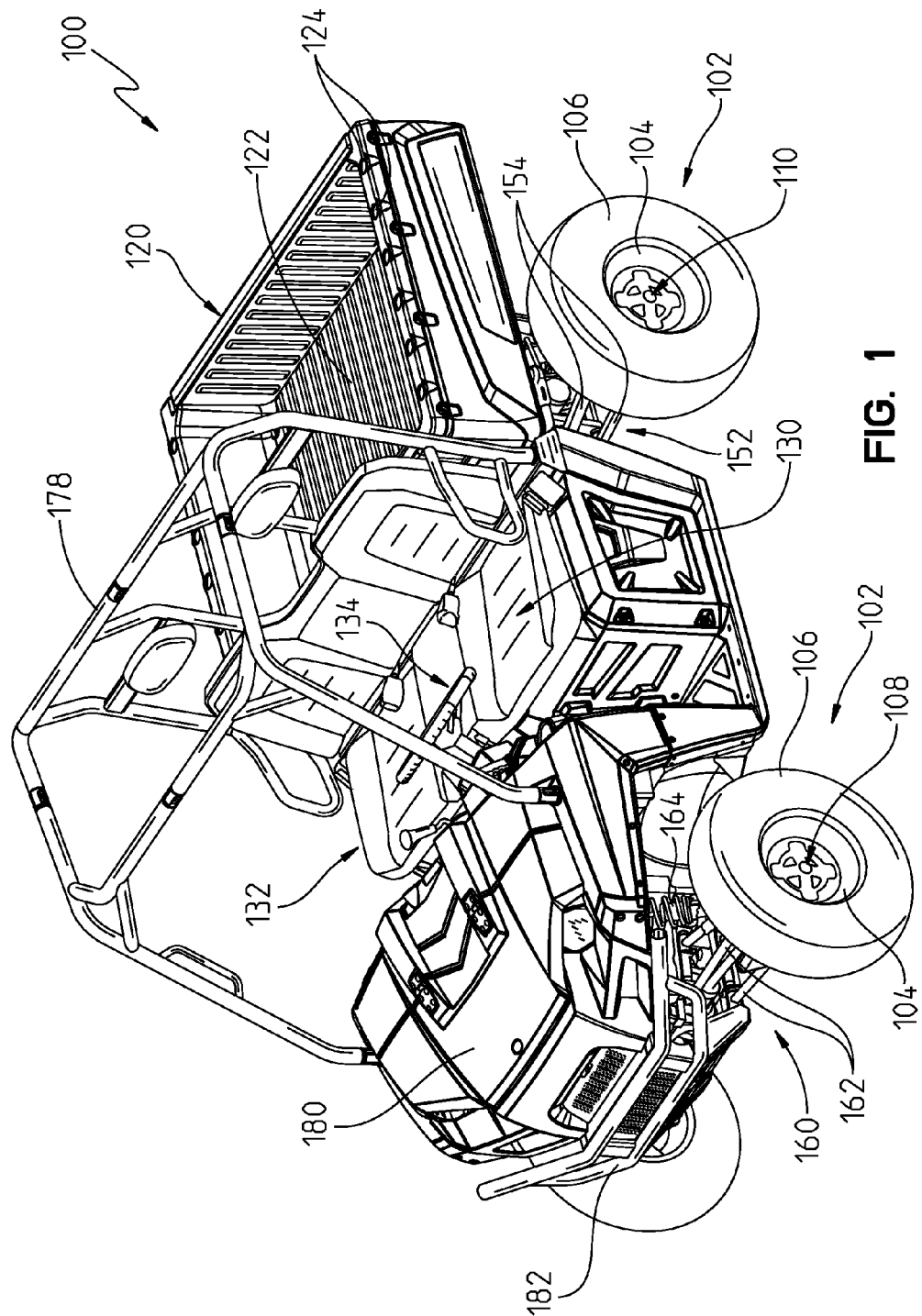
FIG. 1 is a perspective view of an exemplary utility vehicle.

Corresponding reference characters indicate corresponding parts throughout the several views. Unless stated otherwise the drawings are proportional.

The embodiments disclosed below are not intended to be exhaustive or to limit the invention to the precise forms disclosed in the following detailed description. Rather, the embodiments are chosen and described so that others skilled in the art may utilize their teachings. While the present disclosure is primarily directed to a utility vehicle, it should be understood that the features disclosed herein may have application to other types of vehicles such as all-terrain vehicles, motorcycles, watercraft, snowmobiles, and golf carts. Further, although described in the context of an electric vehicle, the embodiments disclosed herein may be implemented as part of a hybrid vehicle.

Referring to FIG. 1, an illustrative embodiment of a vehicle 100 is shown. Vehicle 100 as illustrated includes a plurality of ground engaging members 102. Illustratively, ground engaging members 102 are wheels 104 and associated tires 106. Other exemplary ground engaging members include skis and tracks. In one embodiment, one or more of the wheels may be replaced with tracks, such as the Prospector II Tracks available from Polaris Industries, Inc. located at 2100 Highway 55 in Medina, Minn. 55340.

In addition to vehicle 100, the teachings of the present disclosure may be used in combination with the suspension systems, drive configurations, modular sub-sections, and other features described in any one of U.S. Provisional Patent Application Ser. No. 60/918,502, titled VEHICLE, filed Mar. 16, 2007; U.S. Provisional Patent Application Ser. No. 60/918,556, titled VEHICLE, filed Mar. 16, 2007; U.S. Provisional Patent Application Ser. No. 60/918,444, titled VEHICLE WITH SPACE UTILIZATION, filed Mar. 16, 2007; U.S. Provisional Patent Application Ser. No. 60/918,356, titled UTILITY VEHICLE HAVING MODULAR COMPONENTS, filed Mar. 16, 2007; U.S. Provisional Patent Application Ser. No. 60/918,500, titled METHOD AND APPARATUS RELATED TO TRANSPORTABILITY OF A VEHICLE, filed Mar. 16, 2007; U.S. Utility patent application Ser. No. 12/050,048, titled VEHICLE WITH SPACE UTILIZATION, filed Mar. 17, 2008; U.S. Utility patent application Ser. No. 12/050,064, titled VEHICLE WITH SPACE UTILIZATION, filed Mar. 17, 2008; U.S. Utility patent application Ser. No. 12/050,041, titled METHOD AND APPARATUS RELATED TO TRANSPORTABILITY OF A VEHICLE, filed Mar. 17, 2008; U.S. Utility patent application Ser. No. 12/092,151, titled UTILITY VEHICLE HAVING MODULAR COMPONENTS, filed Apr. 30, 2008; U.S. Utility patent application Ser. No. 12/092,153, titled VEHICLE, filed Apr. 30, 2008; U.S. Utility patent application Ser. No. 12/092,191, titled VEHICLE, filed Apr. 30, 2008, U.S. Utility patent application Ser. No. 12/135,107, titled VEHICLE, filed Jun. 6, 2008, U.S. Utility patent application Ser. No. 12/134,909, titled SUSPENSION SYSTEMS FOR A VEHICLE, filed Jun. 6, 2008, U.S. Utility patent application Ser. No. 12/218,572, titled FLOORBOARD FOR A VEHICLE, filed Jul. 16, 2008, and U.S. Utility patent application Ser. No. 12/317,298, titled VEHICLE, filed Dec. 22, 2008, the disclosures of which are expressly incorporated by reference herein.

Referring to the illustrated embodiment in FIG. 1, a first set of wheels, one on each side of vehicle 100, generally correspond to a front axle 108. A second set of wheels, one on each side of vehicle 100, generally correspond to a rear axle 110. Although each of front axle 108 and rear axle 110 are shown having a single ground engaging members 102 on each side, multiple ground engaging members 102 may be included on each side of the respective front axle 108 and rear axle 110. As configured in FIG. 1, vehicle 100 is a four wheel, two axle vehicle. As mentioned herein one or more of ground engaging members 102 are operatively coupled to a drivetrain 112 (see FIGS. 7 and 8) to power the movement of vehicle 100, as further described herein.

Returning to FIG. 1, vehicle 100 includes a bed 120 having a cargo carrying surface 122. Cargo carrying surface 122 may be flat, contoured, and/or comprised of several sections. Bed 120 further includes a plurality of mounts 124 for receiving an expansion retainer (not shown) which may couple various accessories to bed 120. Additional details of such mounts and expansion retainers are provided in U.S. Pat. No. 7,055,454, to Whiting et al., filed Jul. 13, 2004, titled "Vehicle Expansion Retainers," the disclosure of which is expressly incorporated by reference herein. Further reference is made to our pending applications Ser. No. 12/135,107 filed Jun. 6, 2008, entitled "VEHICLE"; Ser. No. 12/134,909 filed Jun. 6, 2008, entitled "SUSPENSION SYSTEMS FOR A VEHICLE" and Ser. No. 12/317,298 filed Dec. 22, 2008, entitled "VEHICLE", the disclosures of which are expressly incorporated by reference herein. Further reference is made to our co-pending, concurrently filed provisional application, Ser. No. 61/187,147, the subject matter of which is incorporated herein by reference.

Figure 2:
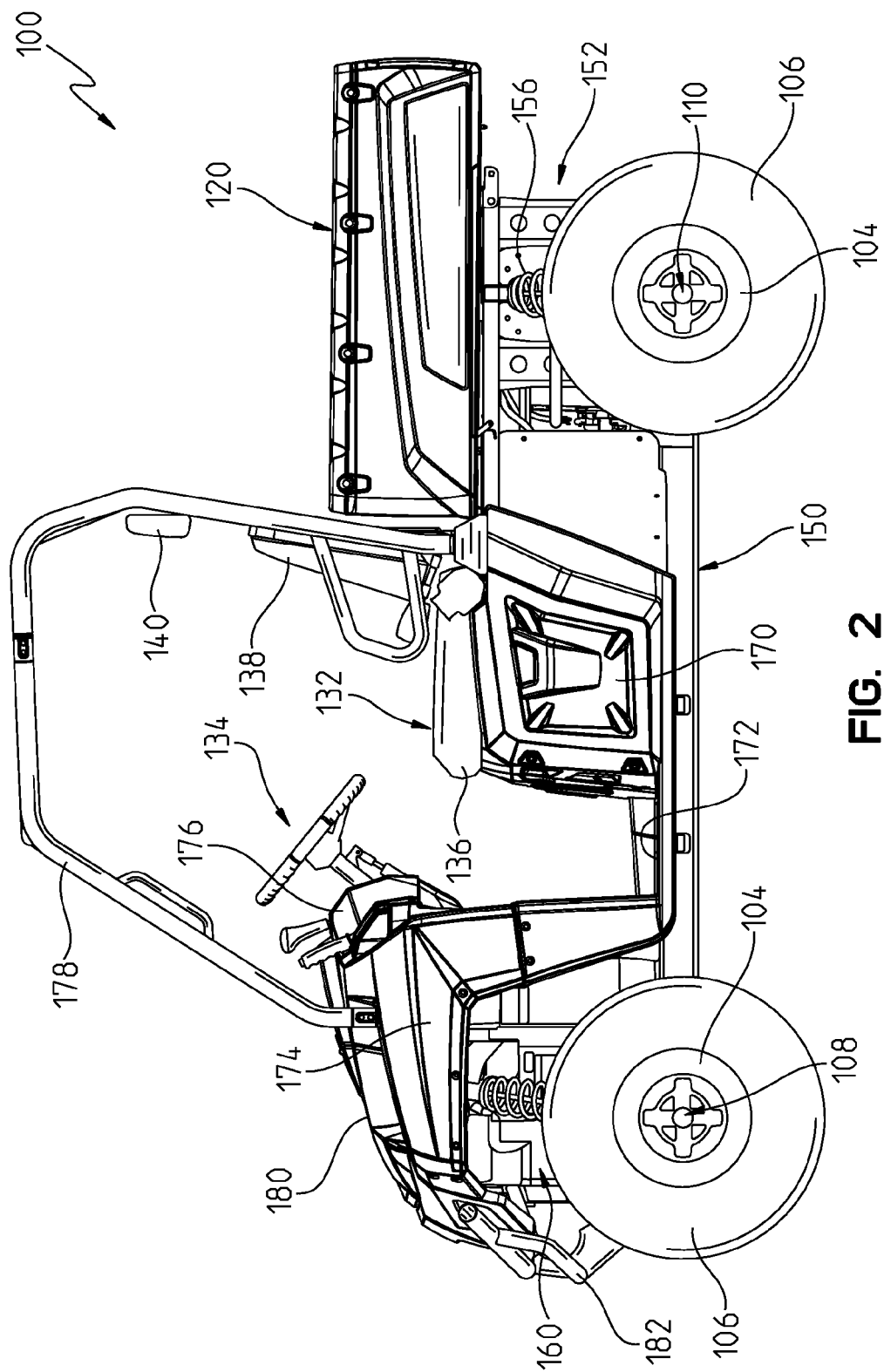
FIG. 2 illustrates a left side view of the exemplary utility vehicle of FIG. 1.
Figure 3:
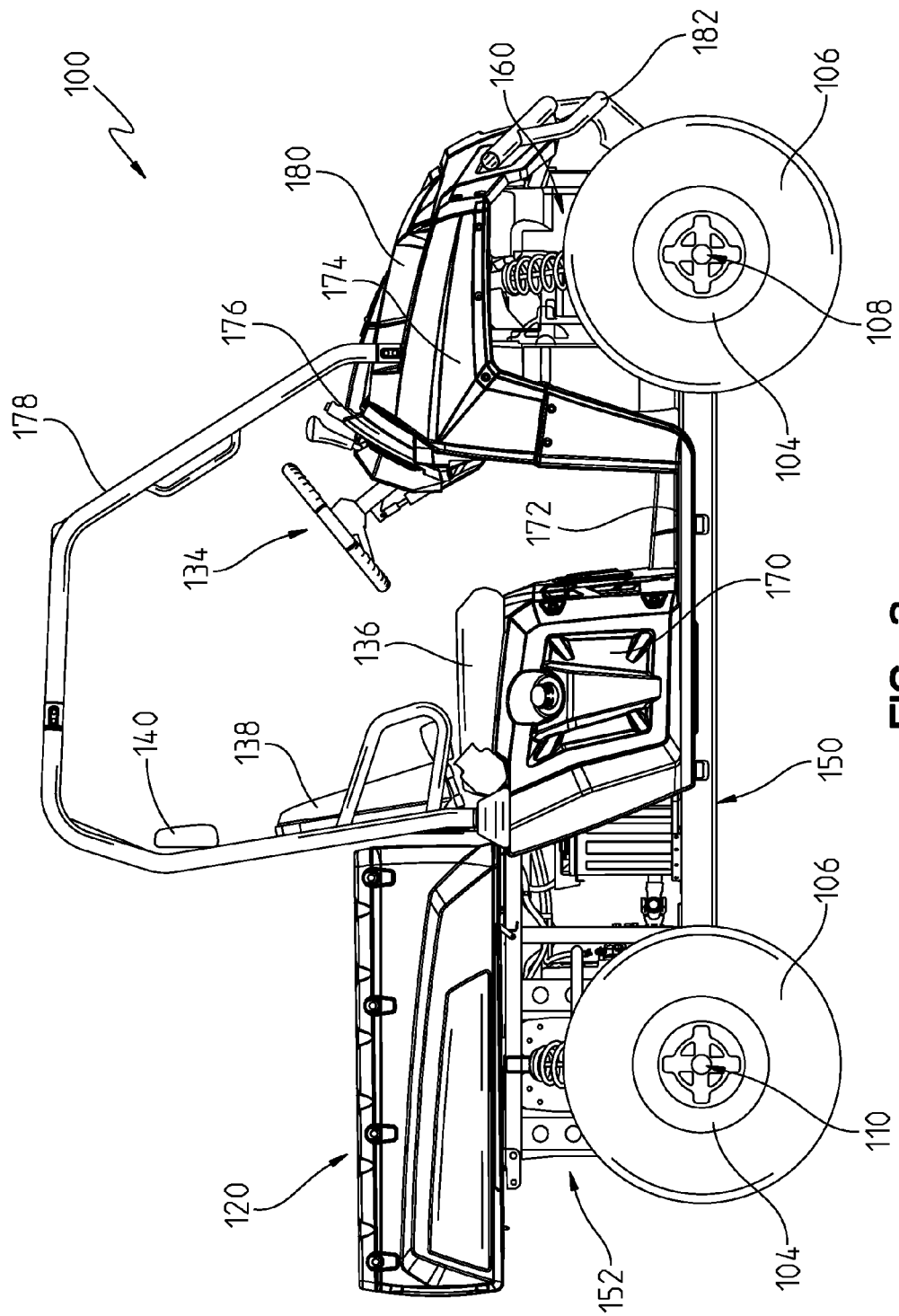
FIG. 3 illustrates a right side view of the exemplary utility vehicle of FIG. 1.

Vehicle 100 includes an operator area 130 including seating 132 for one or more passengers. Operator area 130 further includes a plurality of operator controls 134 by which an operator may provide input into the control of vehicle 100. Controls 134 may include controls for steering, acceleration and braking. As shown in FIGS. 2 and 3, seating 132 includes a seat bottom portion 136 and a seat back portion 138 and head rests 140. Seating 132 is shown in the present embodiment, as a split bench with the operator side being adjustable along the longitudinal axis of vehicle 100. As shown herein, the operator area 130 only shows a single bench seat 132, but it should be appreciated that multiple tandem seats could be incorporated.

Vehicle 100 includes four wheel independent suspensions. Referring to FIG. 1, each of ground engaging members 102 of rear axle 110 is coupled to frame 150 (FIG. 2) through a rear suspension 152. Rear suspension 152 includes double A-arms 154 and a shock 156 (FIG. 2). Each of ground engaging members 102 of front axle 108 is coupled to frame 150 through front suspensions 160. Front suspension 160 includes double A-arms 162 and a shock 164 (FIG. 1).

Figure 4:
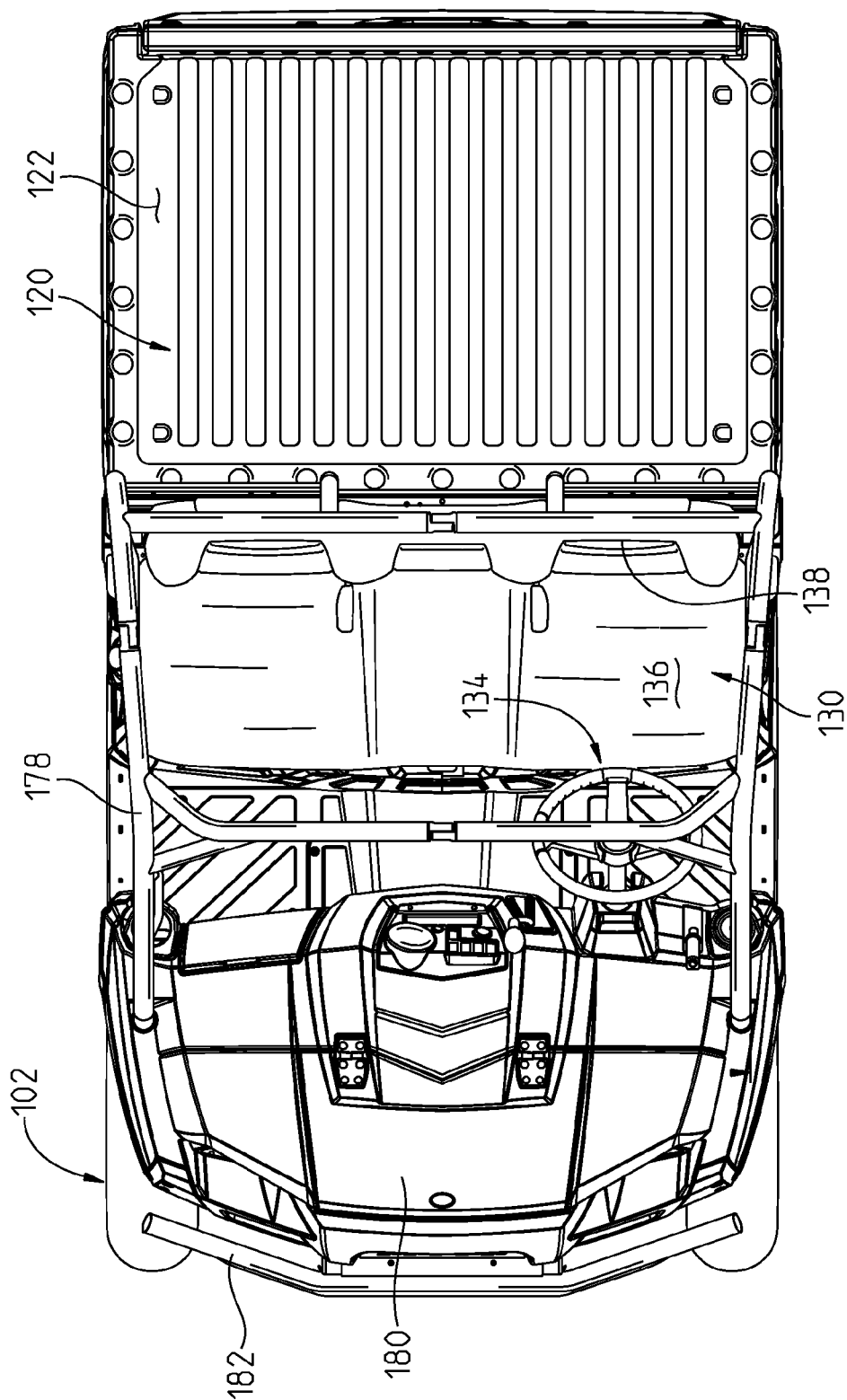
FIG. 4 illustrates a top view of the exemplary utility vehicle of FIG. 1.

In addition to the bed 120, utility vehicle includes a plurality of body components, and as best shown in FIGS. 2-4, namely side panels 170, floor boards 172, wheel wells 174, dash 176, rollover structure 178, hood 180, and bumper 182. All of these items are directly or indirectly attached to and/or supported by the vehicle frame 150.

Figure 5:
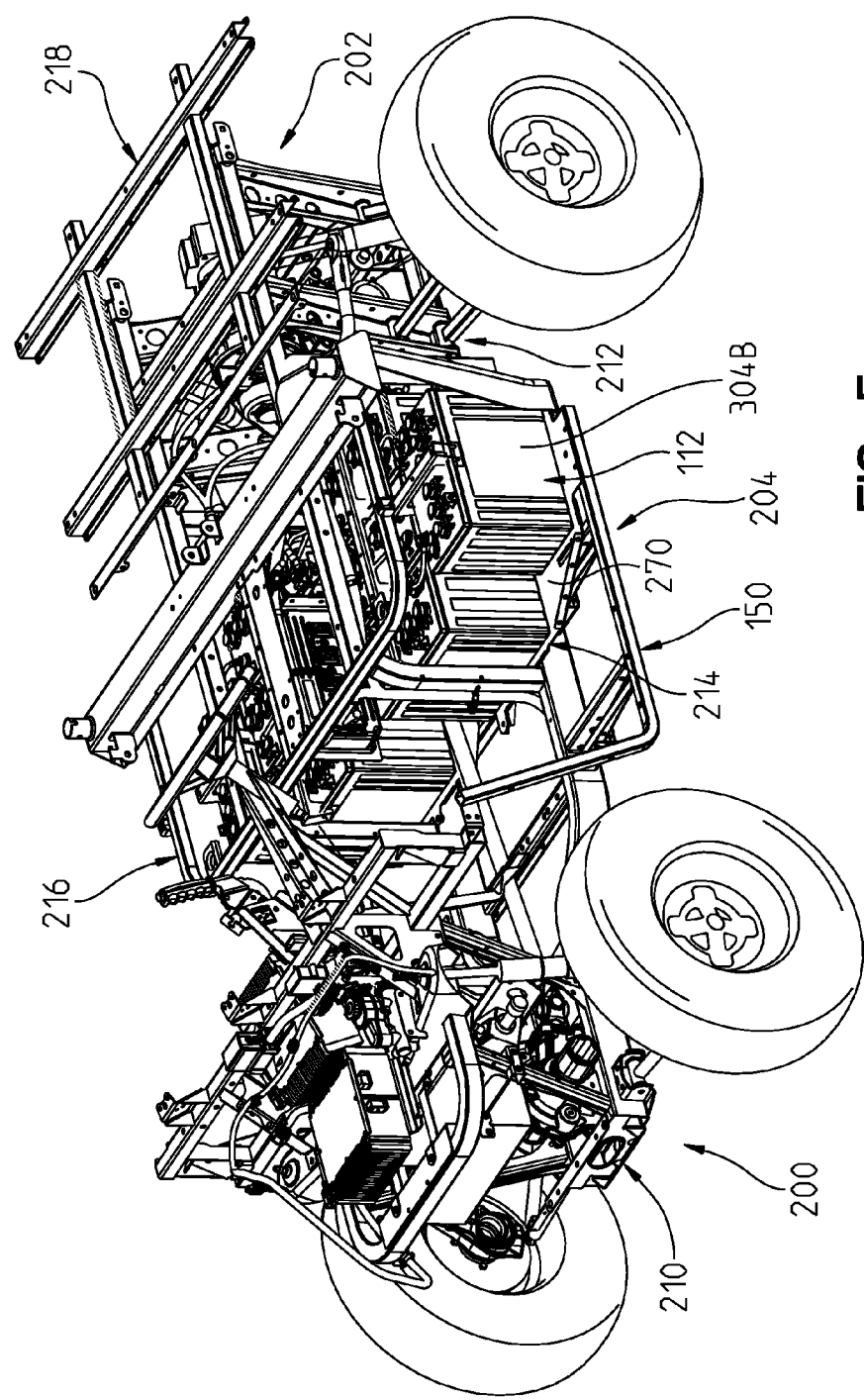
FIG. 5 illustrates a top perspective view of the exemplary utility vehicle of FIG. 1, with the body panels and roll-over structure removed.
Figure 5A:
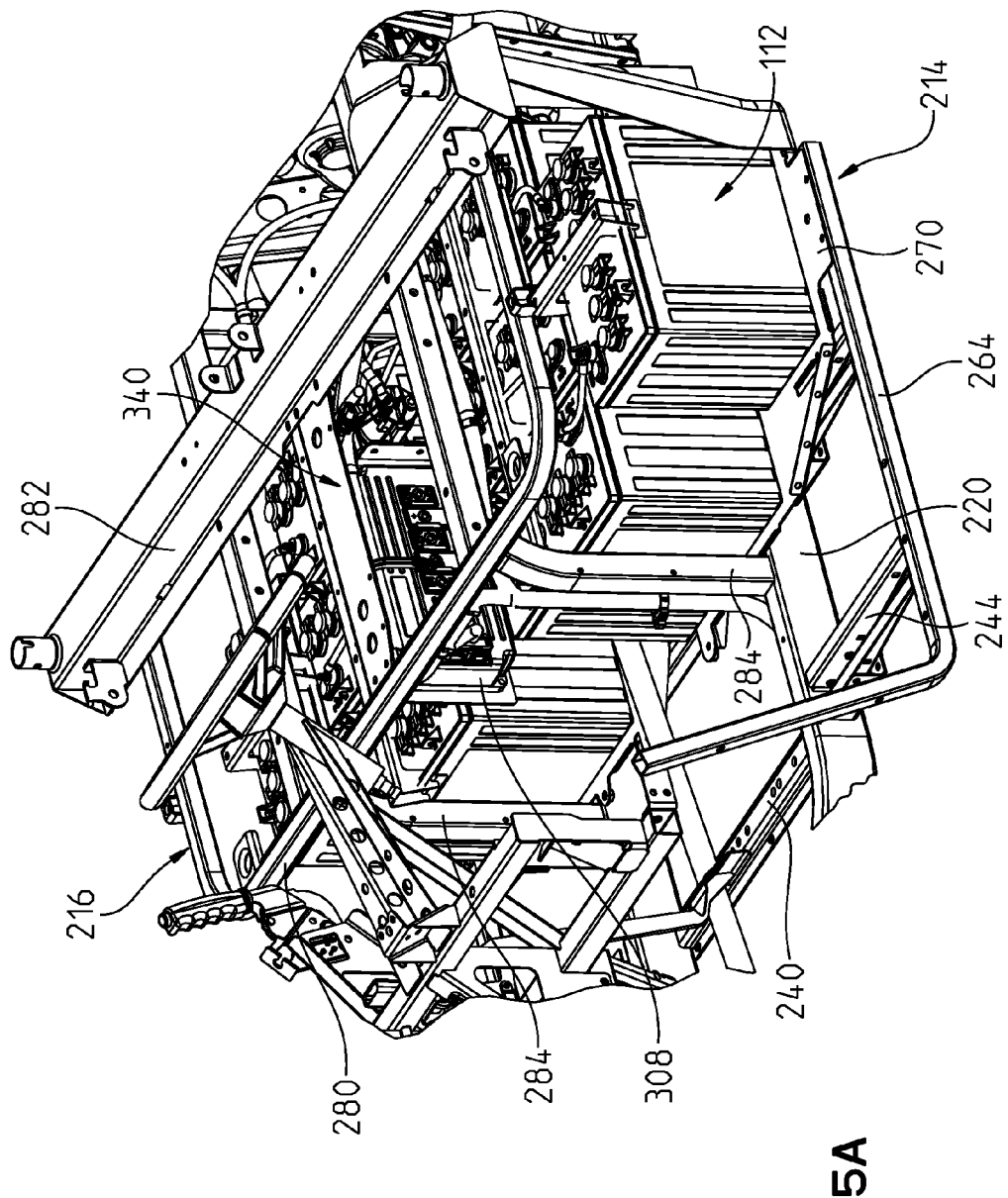
FIG. 5A illustrates an enlarged portion of the central part of vehicle shown in FIG. 5.
Figure 6:
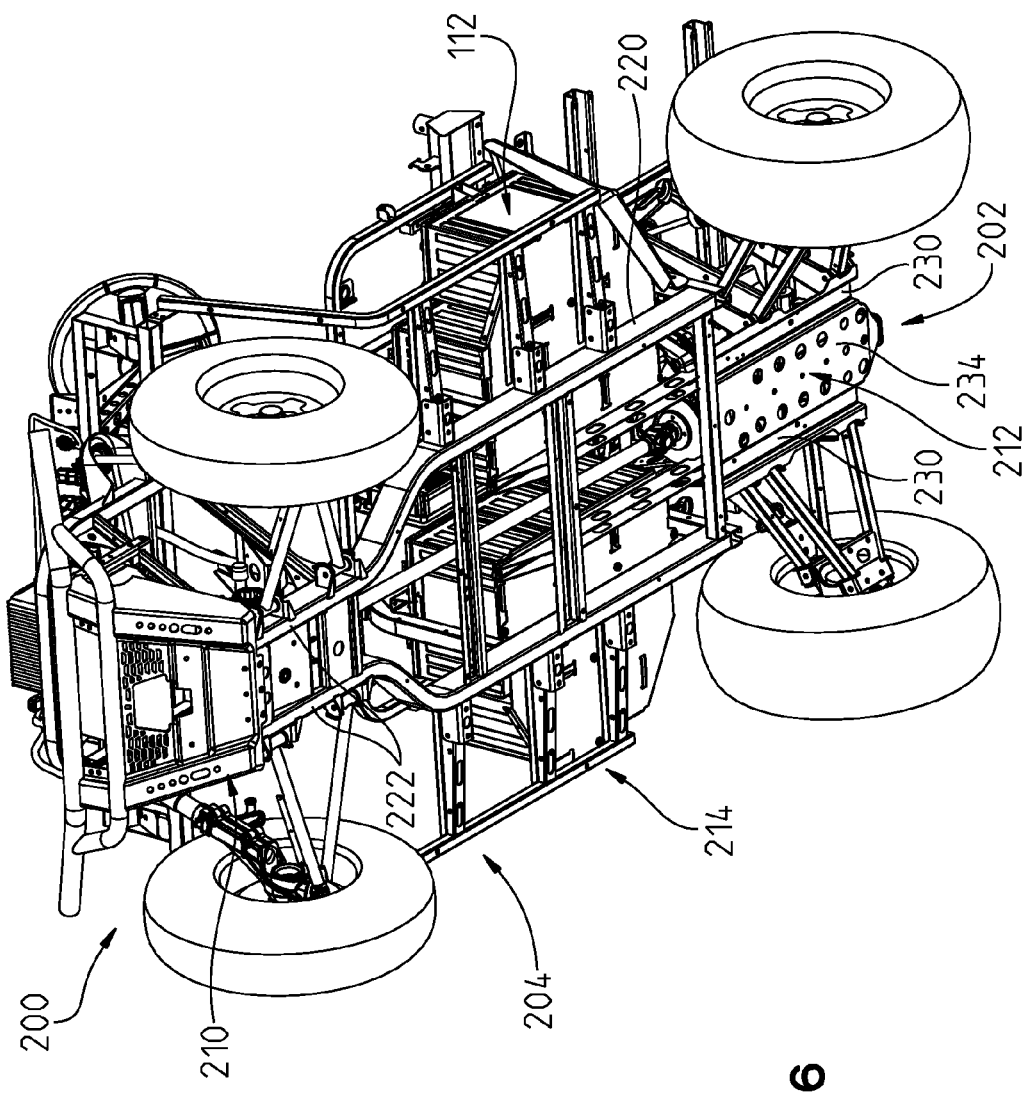
FIG. 6 illustrates a bottom perspective view of the utility vehicle as depicted in FIG. 5.
Figure 6A:
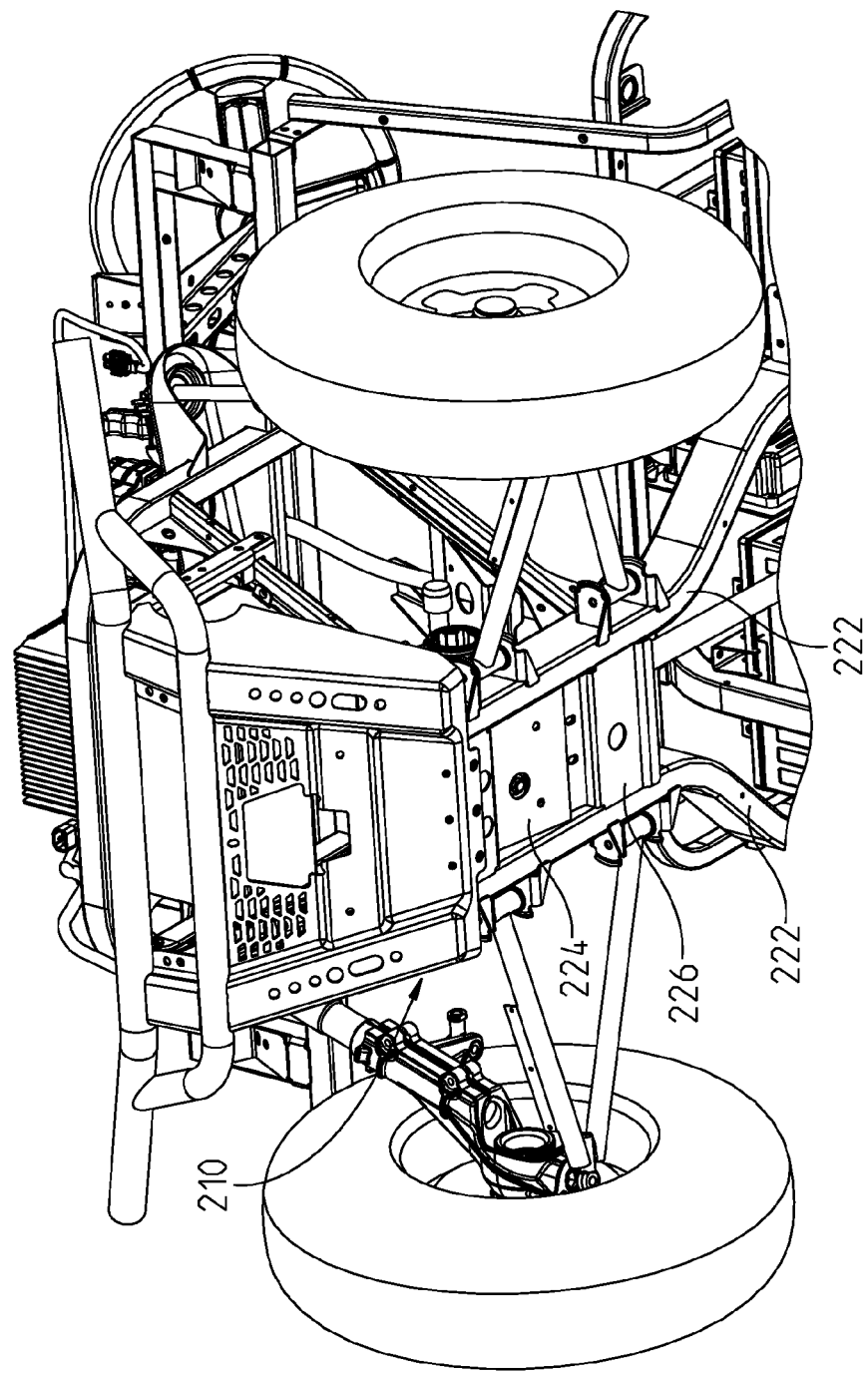
FIG. 6A illustrates an enlarged portion of the vehicle front end shown in FIG. 6.
Figure 6B:
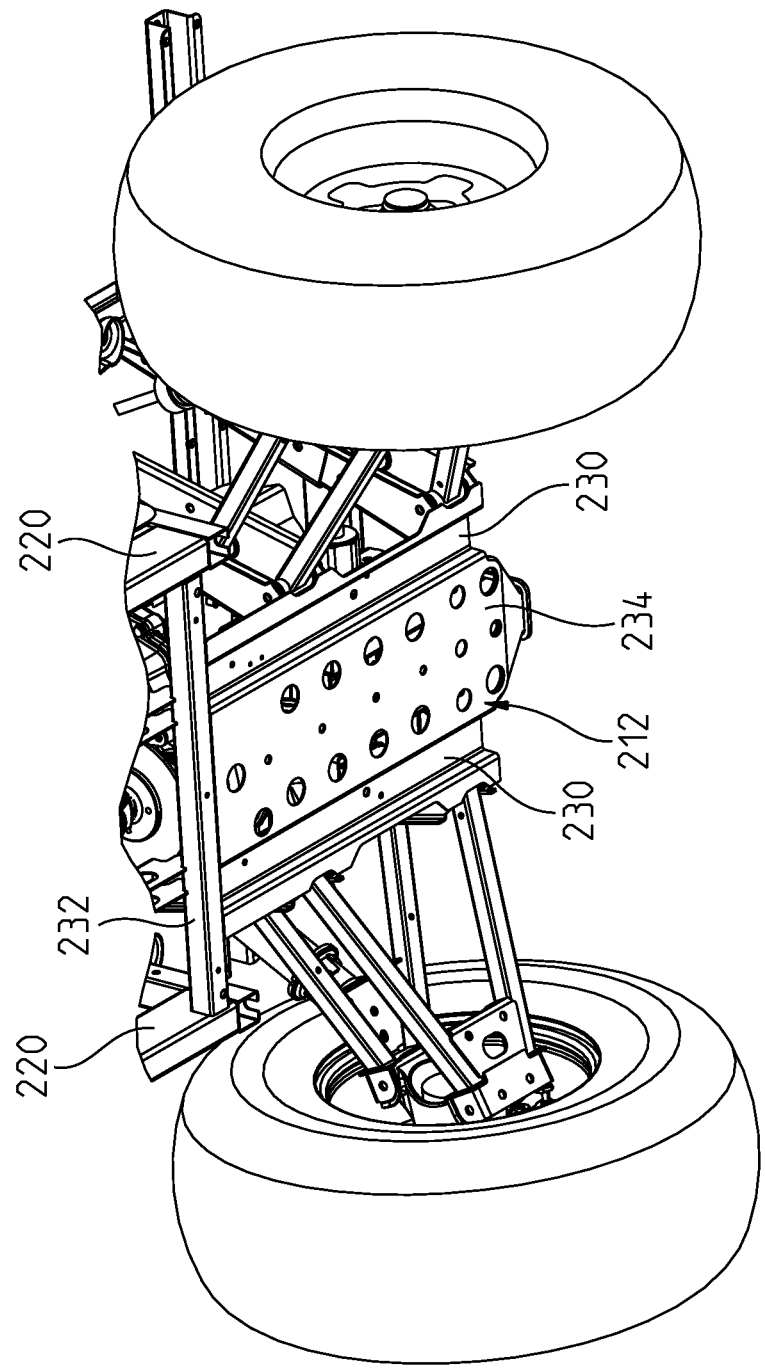
FIG. 6B illustrates an enlarged portion of the vehicle rear end shown in FIG. 6.

With reference now to FIGS. 5, 5A and 6, vehicle 100 is shown with the body accessory parts and rollover structure 178 removed showing basically the frame 150 and drivetrain 112. As shown best in FIG. 5, the vehicle has a front end 200, a rear end 202 and an intermediate portion 204 between the front and rear portion 200, 202. Frame 150 includes corresponding front frame portion 210, rear frame portion 212 and intermediate frame portion 214. The frame portions 210, 212, 214 provide support to drivetrain 112 as further described herein. In addition, frame 150 includes a seat support portion 216 and a bed support portion 218.

With respect to FIGS. 6, and 6A-6C, frame 150 will be described. Frame 150 includes longitudinally extending frame members 220 which extend a substantial length of the vehicle and neck down to form front frame members at 222. As shown best in FIG. 6A, support plates 224 and 226 span the frame members 222 for support as described herein. As shown best in FIG. 6B, rear frame portion 212 is defined by channel members 230 extending from a transverse portion 232 which, in turn, extends between longitudinally extending frame members 220. Plate portion 234 extends across channel members 230 to provide support for a rear portion of the drivetrain 112, as described herein.

Figure 6C:
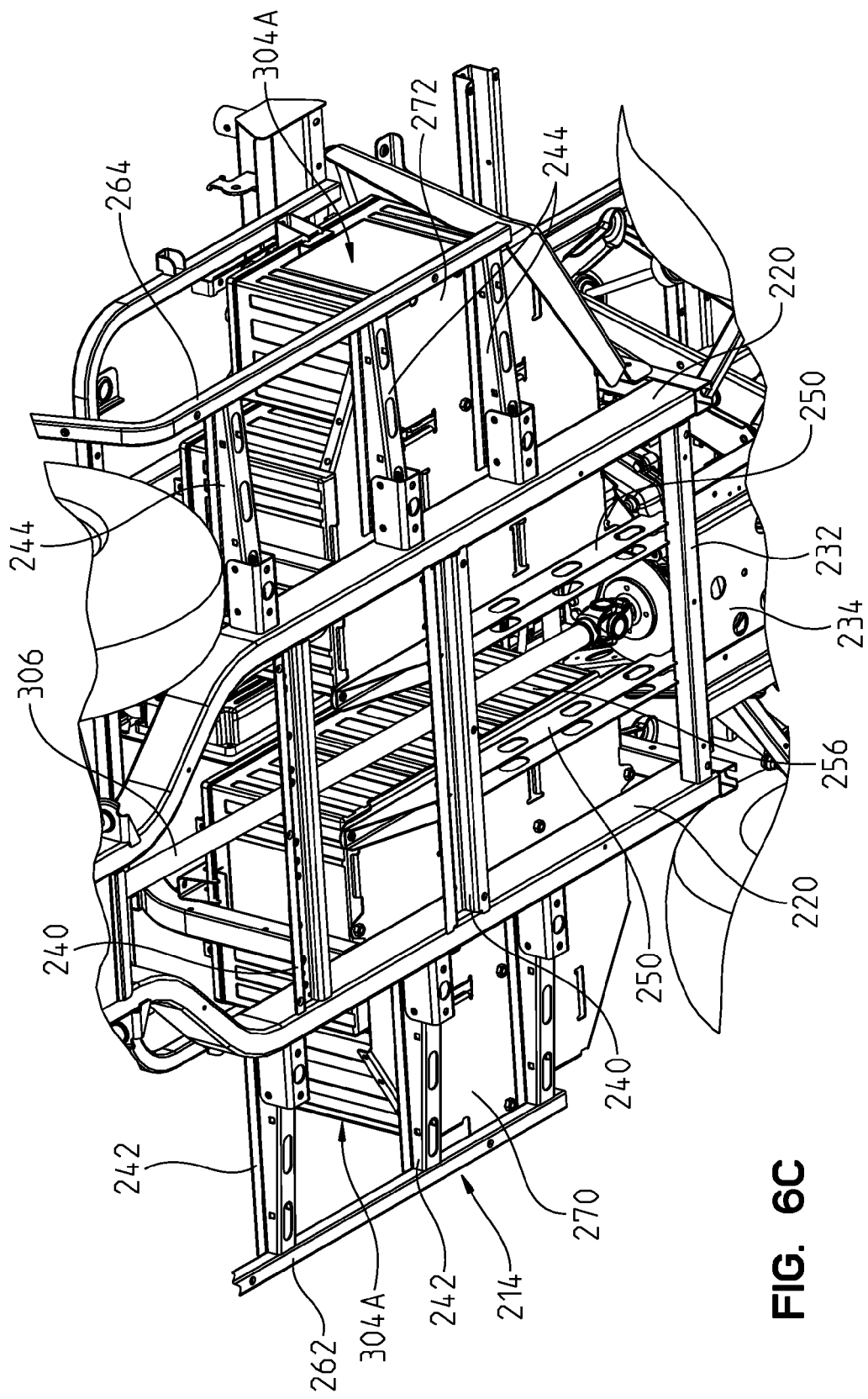
FIG. 6C illustrates an enlarged portion of the vehicle midsection shown in FIG. 6.

As best shown in FIG. 6C, intermediate frame portion 214 is comprised of transverse channels 240 extending between longitudinally extending frame members 220 and transverse channel portions 242 and 244 extending outwardly from longitudinally extending frame members 220. Two longitudinally extending straps 250 extend over one of the transverse channels 240 and over channel 232 defining a longitudinal opening 256 therebetween. The longitudinal opening 256 is positioned generally centrally relative to the lateral width of the vehicle. Frame tube 262 is positioned at the end of transverse channel portions 242 and frame tube 264 is positioned at the end of transverse channel portions 244. A support platform 270 is positioned over channel 250, over at least two of the transverse channel portions 242 and frame tube 262 and a support platform 272 is positioned over the other of the frame members 250 over at least two of the transverse channel portions 244 and over frame tube 264.

With respect again to FIG. 5A, seat support platform 216 is comprised of crossbars 280, 282 which are elevated from the longitudinal extending support members 220 by way of vertical support members 284. As shown, cross bar 280 defines a front end of the seat supporting portion.

Figure 7:
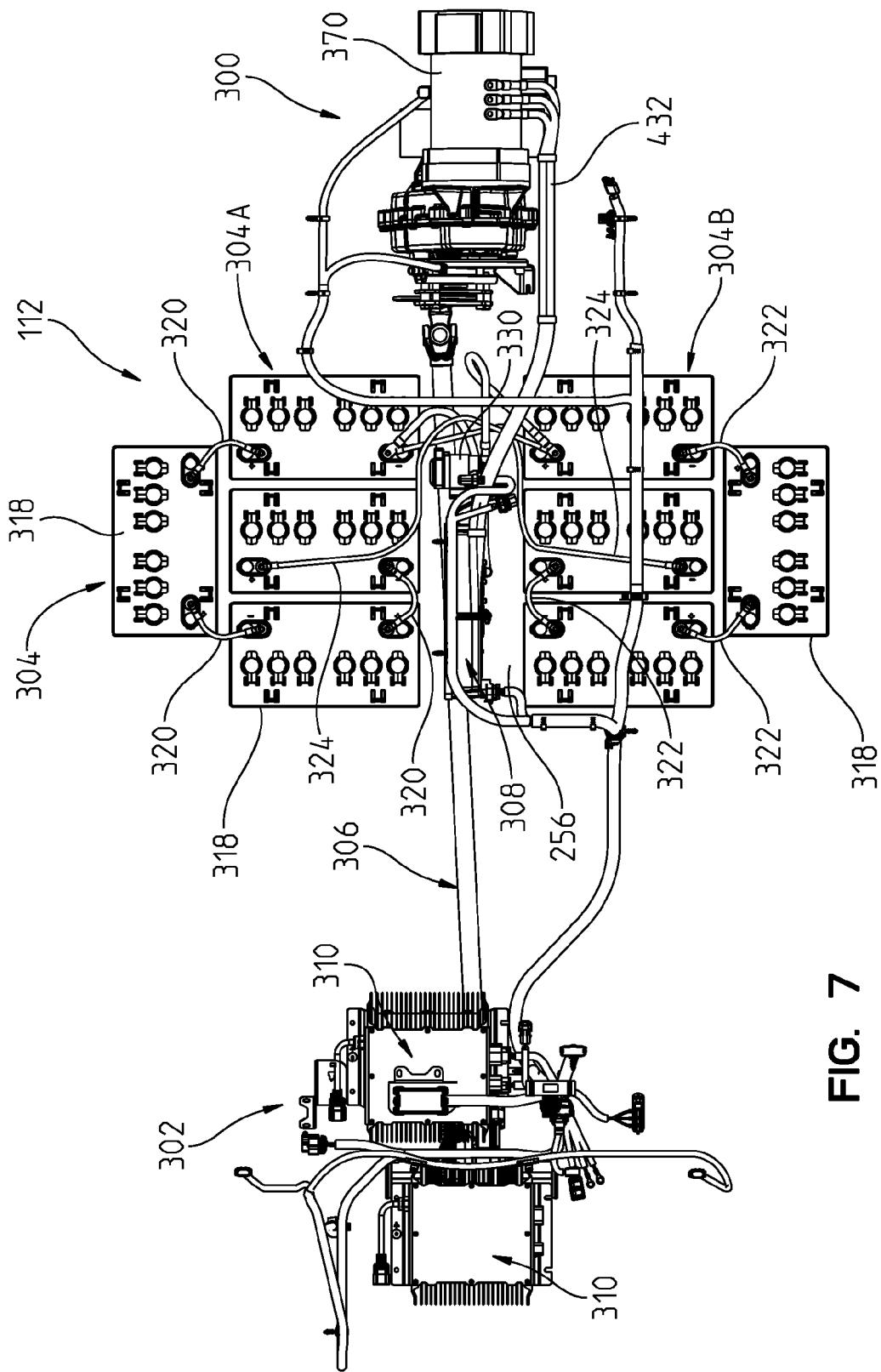
FIG. 7 illustrates a top plan view of the electric drivetrain of the utility vehicle of FIG. 1.

With reference now to FIG. 7, drivetrain 112 is generally comprised of rear drive 300, front drive 302, battery packs 304, a prop shaft 306 interconnecting the rear and front drives 300, 302, and a controller to control the motor speed and other electrical functions. One or more chargers 310 are also provided to recharge the batteries when the vehicle is idle. As also shown, battery packs 304 comprise individual batteries 318 positioned rearward of the front end of the seat supporting portion, and the chargers 310 are positioned forward of the front end of the seat supporting portion.

With respect first to battery packs 304, two groups of batteries 304A and 304B are defined where each battery group 304A, 304B includes a battery 318 of 12V capacity where each of the groups 304A, 304B are wired in series, thereby defining two 48V groups. Each of the groups 304A, 304B are connected through the controller 308 in parallel to define a 48V power source. It should be appreciated that battery group 304B is supported by platform 270 (FIG. 5) whereas battery group 304A is supported by platform 272 (FIG. 6C). With reference to FIGS. 6C and 7, each of the groups of batteries 304A, 304B are also defined so as to flank longitudinal opening 256 to provide room for prop shaft 306 extending therethrough. As shown best in FIG. 7, battery group 304A is serially connected by way of jumper cables 320, batteries in battery group 304B are serially connected by way of jumper cables 322 and battery groups 304A and 304B are connected in parallel by way of battery cables 324. In one embodiment, jumper cables 320 and jumper cables 322 are the same length. As such, only two lengths of battery cable are needed to connect all of the batteries of 304A and 304B together.

Figure 8:
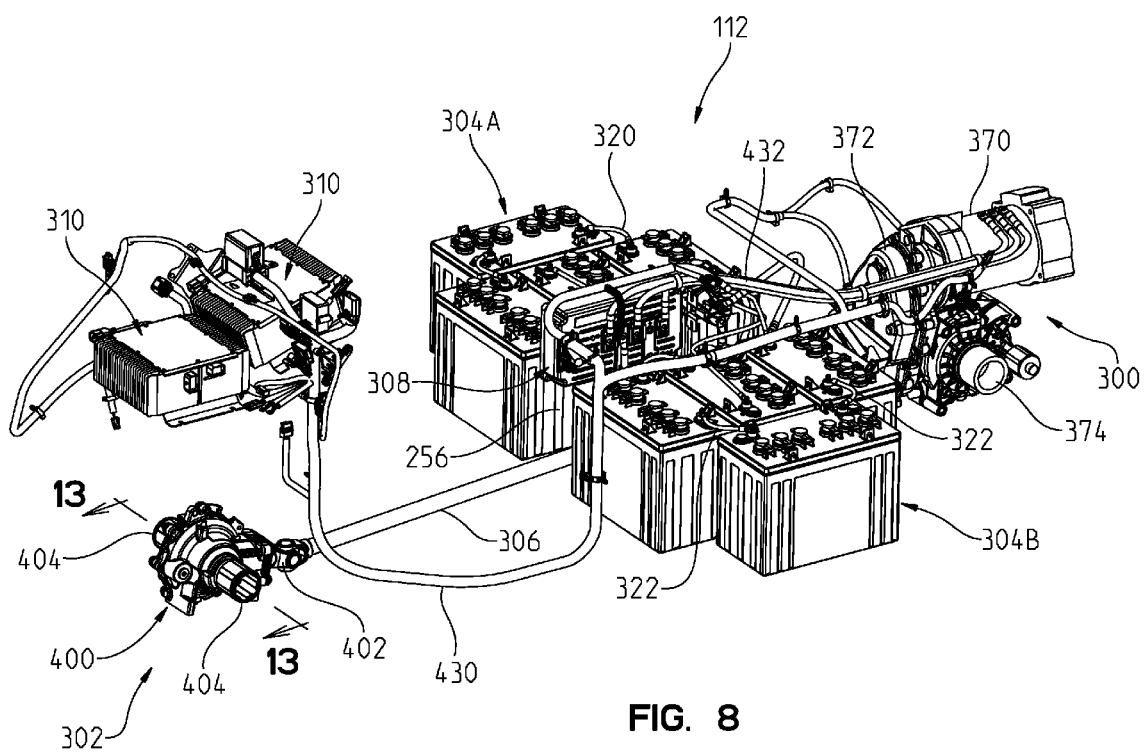
FIG. 8 illustrates a perspective view of the electric drivetrain of the utility vehicle of FIG. 1.
Figure 9:
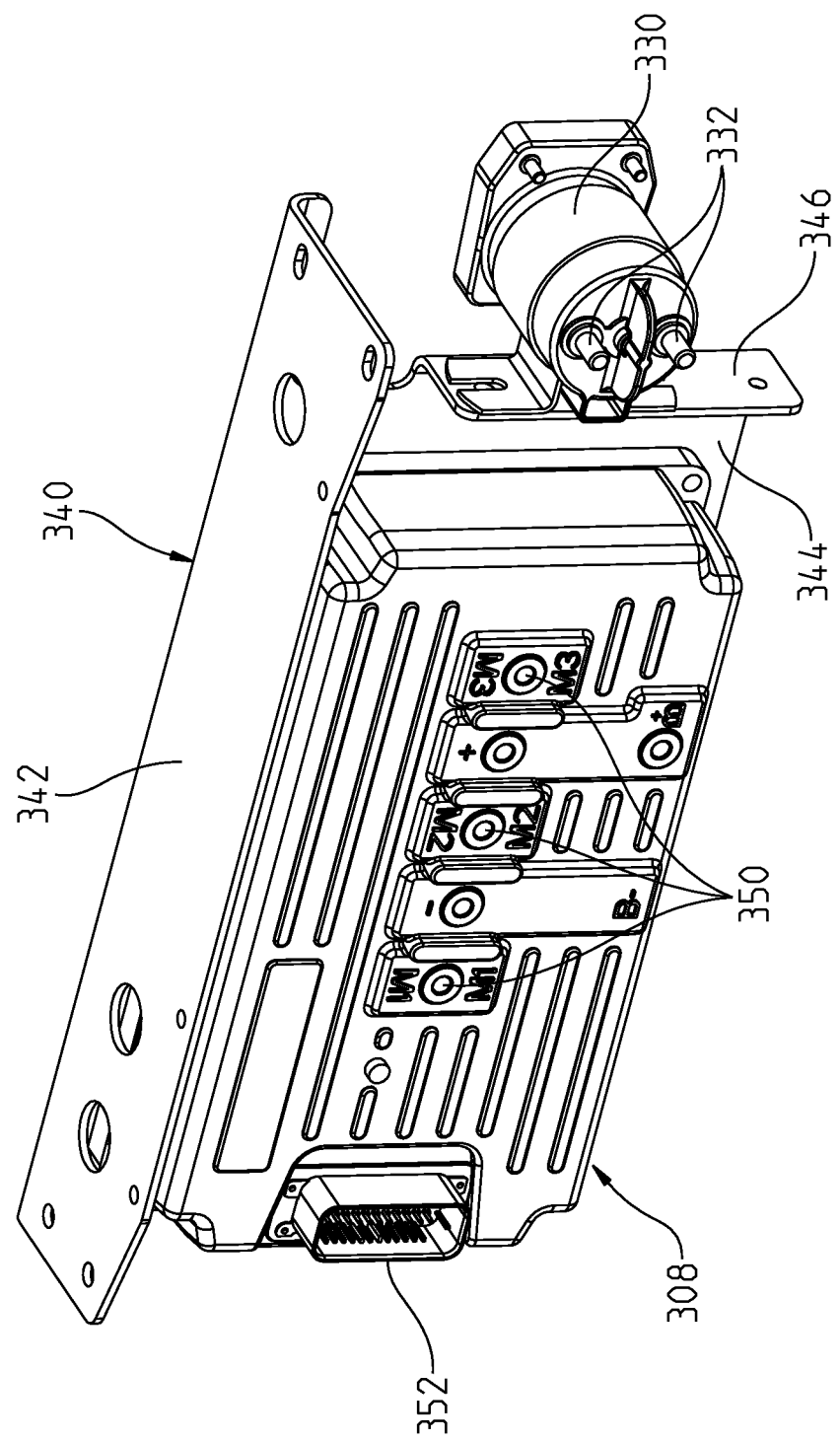
FIG. 9 illustrates a front perspective view of a motor controller of the utility vehicle of FIG. 1.

With reference now to FIGS. 7-9, controller 308 and contactor 330 are shown in greater detail. As shown best in FIG. 9, both the controller and contactor are mounted on a support member 340 having an upper flange 342, a plate portion 344 and an end flange 346. As shown, controller 308 can be mounted to plate portion 344 with contactor 330 mounted to end flange 346. Top flange 342 can be used to mount the controller and contactor 330 intermediate the battery groups 304A, 304B into the longitudinal spacing 256 such that top flange 342 is arranged to span and attach to crossbars 280, 282 (FIG. 5A). As also shown, contactor 330 is oriented along a horizontal axis, with its contacts 332 projecting in the same direction as connections for controller 308. This allows all of the electrical connections to be made from the same plane of the controller 330, as well as allows the movements of the contactor relay to be along a horizontal plane, unaffected by road vibration. As depicted, contactor 330 is a sealed contactor.

As mentioned above, the groups of batteries 304A, 304B input to contactor 330 and to controller 308 as a source of power to drivetrain 112. In the embodiment described, controller 308 is manufactured by Sevcon, Inc. of Southborough, Mass. 01772, and is a Series G48 AC motor controller, Model G4865. As shown best in FIG. 9, controller 308 has three AC motor outputs 350 and an I/O connection port at 352. It should be appreciated from viewing FIG. 9, that all of the main electrical connections to the controller 308 and contactor 330 are centrally located, and are made to one face, that is the side face as viewed in FIG. 9. In one embodiment, a heat sink is mounted to controller 308 on the side opposite from outputs 350.

Figure 10A:
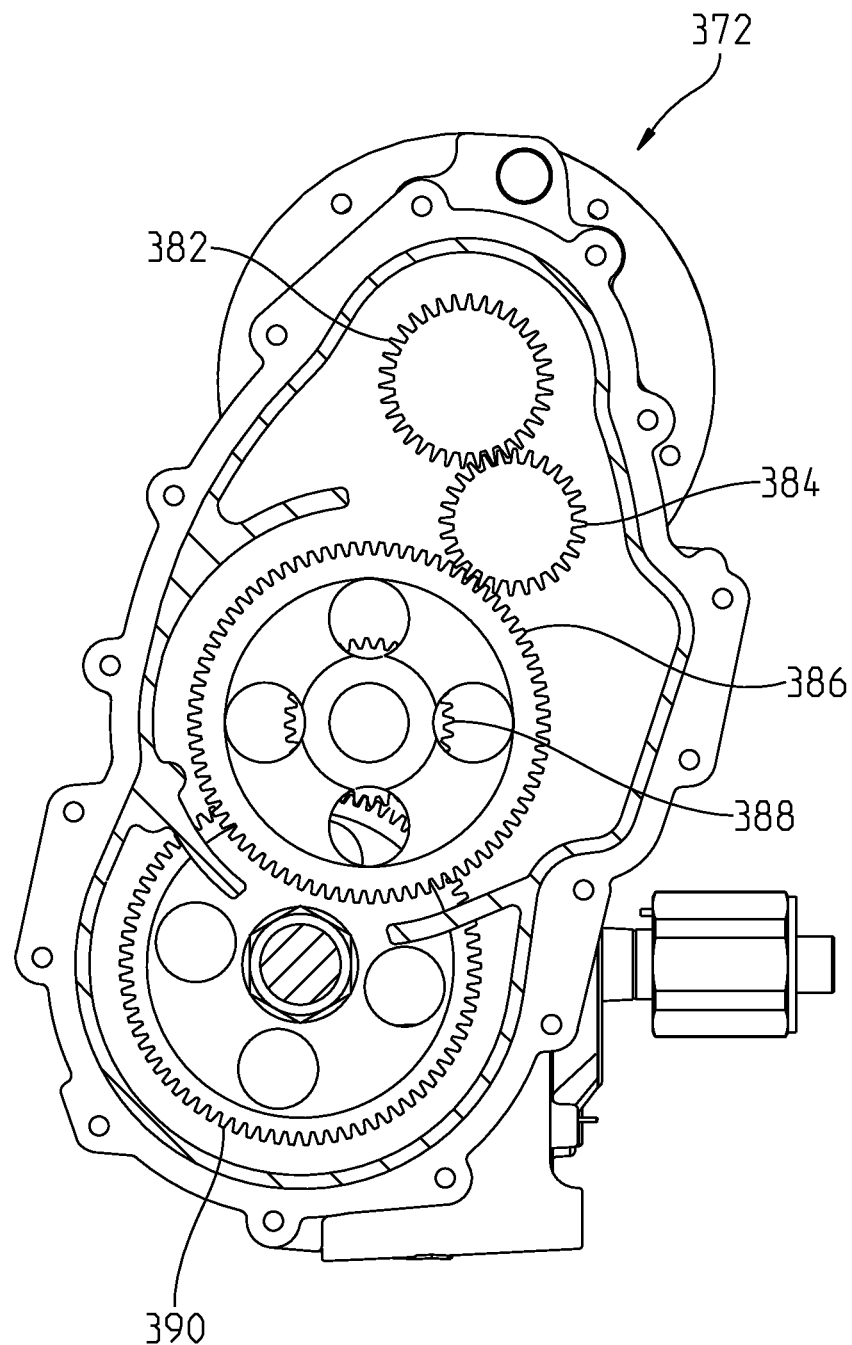
FIG. 10A illustrates a cross-sectional view taken through lines 10A-10A of FIG. 10.
Figure 11:
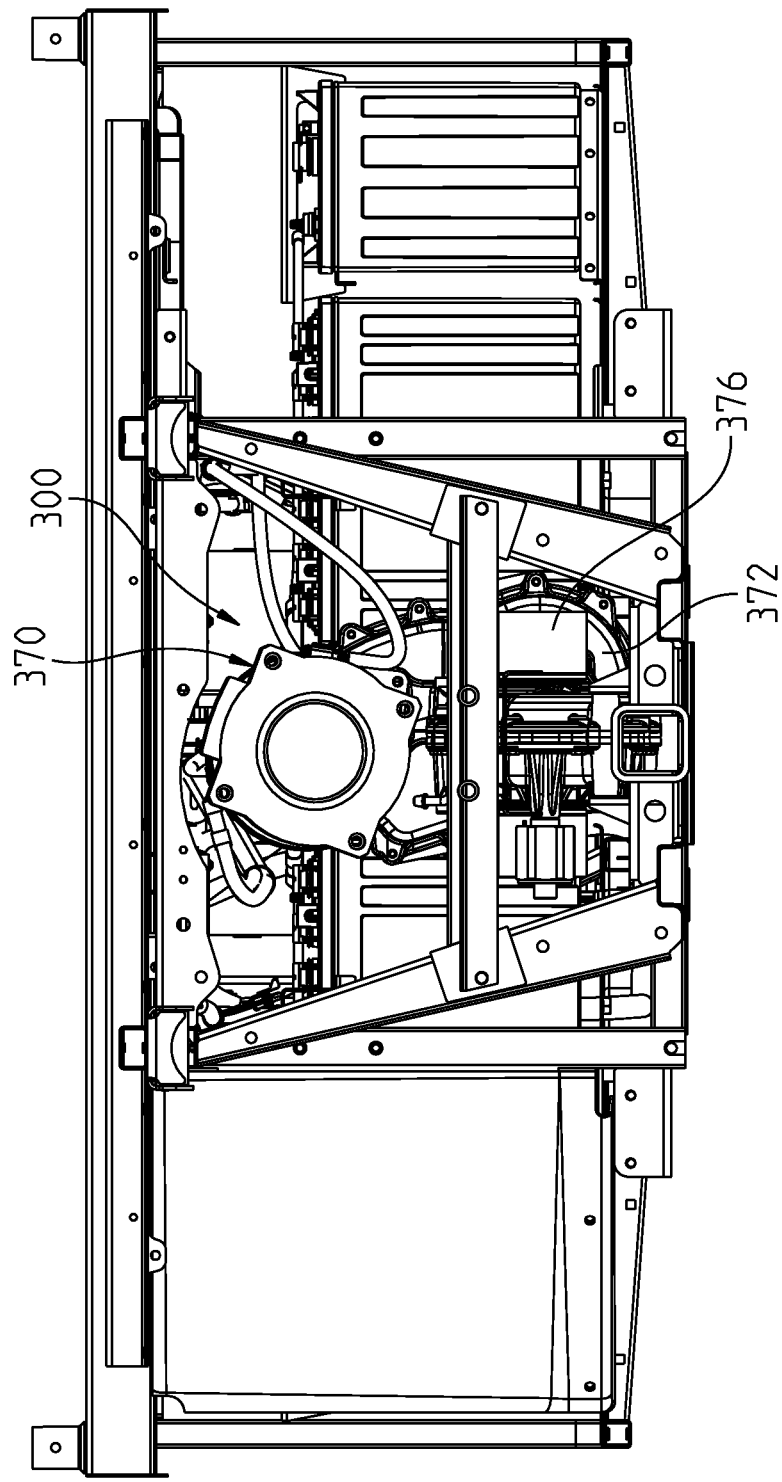
FIG. 11 illustrates a rear view of the rear frame and drivetrain.

With reference now to FIGS. 7, 10 and 11, rear drivetrain portion 300 is generally comprised of an AC asynchronous motor 370 (or AC induction), a transaxle 372 which in turn drives differential output 374 of differential 376 and forward drive shaft 378 which drives prop shaft 306 through universal joint 380 (FIG. 10). In the embodiment shown, motor 370 is manufactured by ABM Greiffenberger Antriebstechnik GmbH, of Marktredwitz, Germany model number 112-200-4. As shown best in FIG. 10A, transaxle 372 comprises an input from motor 370 to drive gear 382, which in turn drives idler 384. Idler 384 drives pinion 386 which is connected to reduction gear 388 which drives pinion 390. Pinion 390 drives the differential which drives differential output 374 (FIG. 10), and drives the forward drive shaft 378 (FIG. 10).

Figure 12:
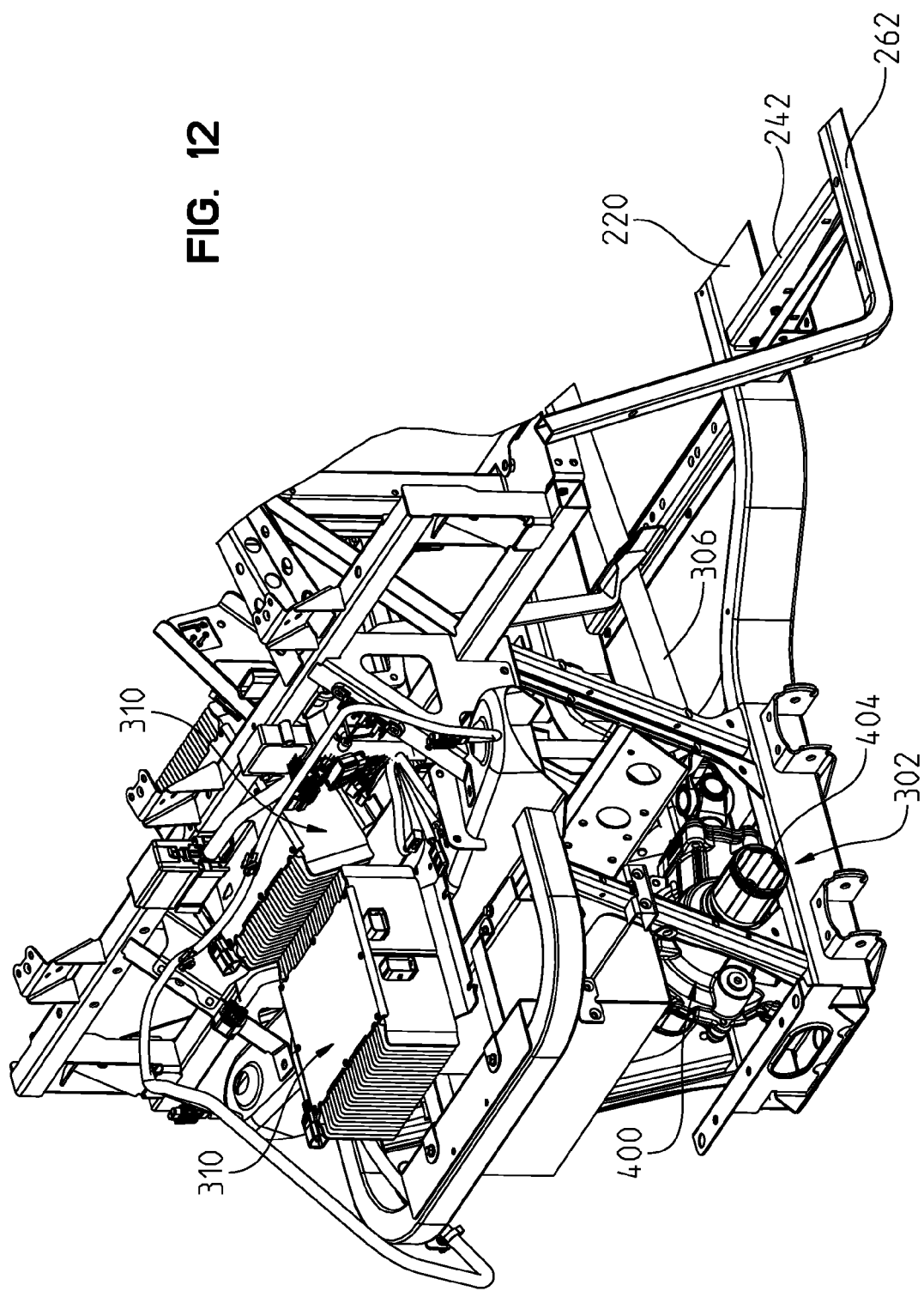
FIG. 12 illustrates a front perspective view of the front frame and front portion of the drivetrain.
Figure 13:
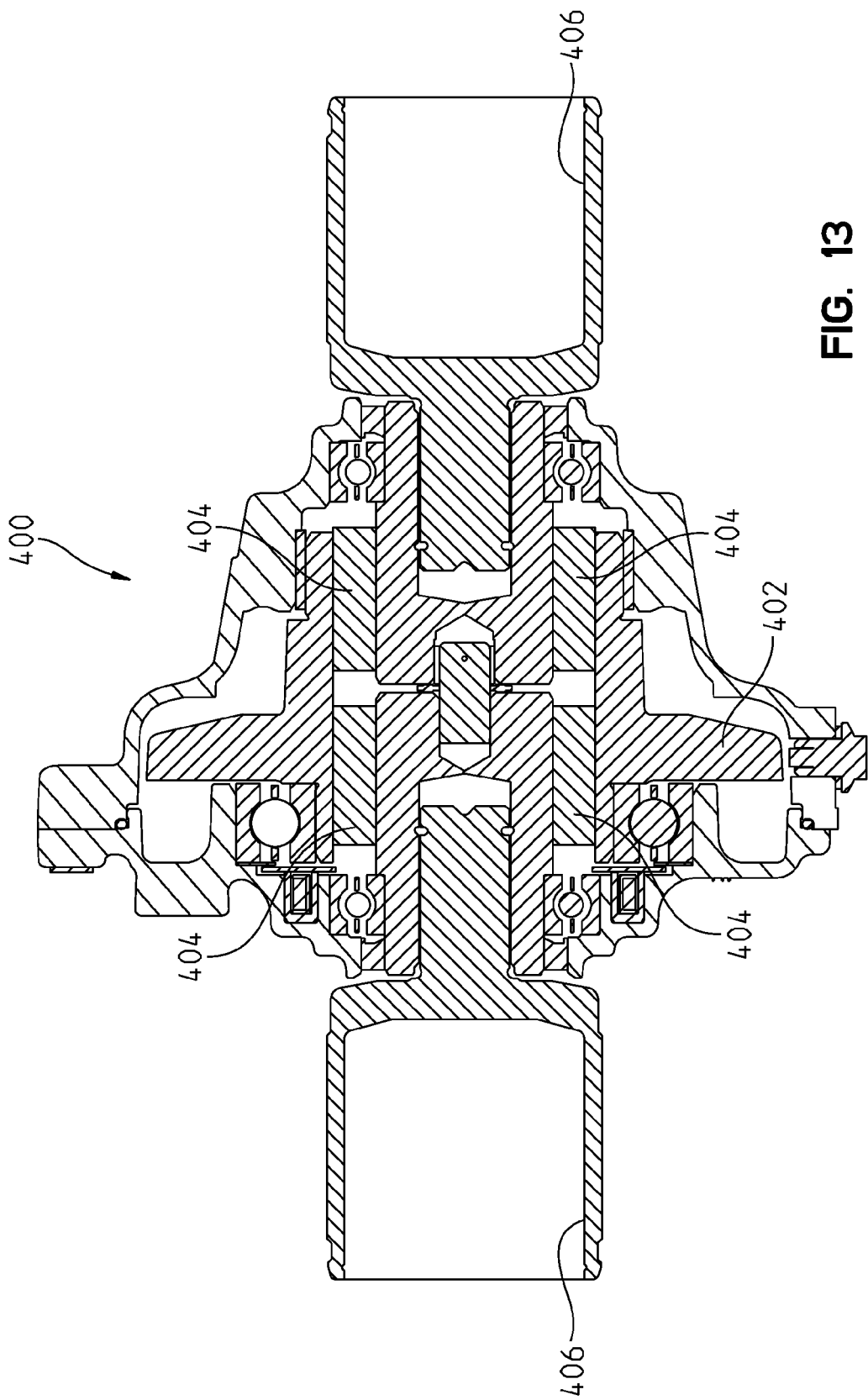
FIG. 13 illustrates a cross-sectional view of the front differential through lines 13-13 of FIG. 8.

With respect now to FIGS. 8, 12 and 13, the front drivetrain portion 302 will be described in greater detail. As shown in FIGS. 8 and 12, front drivetrain portion 302 includes a front differential 400 interconnected to prop shaft 306 by way of a universal joint 402. Differential 400 has two outputs 404 each of which connect to one of the front wheels by way of drive shafts. As shown, differential 400 is an automatic locking front differential manufactured by Hilliard Corporation of Elmira, N.Y., and has an overrunning clutch and as shown in FIG. 13, includes roller bearings 408. Differential 400 also operates under the principle described in U.S. Pat. No. 5,036, 939, the subject matter of which is incorporated herein by reference. Another overrunning clutch is shown in U.S. Pat. RE38,012E, the subject matter of which is incorporated herein by reference. As shown best in FIG. 13, differential 400 has a differential gear 402 which is engaged/disengaged by a plurality of roller bearings 404, during wheel slippage, which in turn drives differential outputs 406, to power the front wheels. Differential 400 is designed to engage when the wheel slippage is in the range of 10-30%.

As mentioned above, battery groups 304A, 304B, power contactor 330 and controller 308 (FIG. 7) are all positioned under seat support. The speed of the vehicle 100 is controlled by a signal pickup carried through cable 430 and interconnected to I/O connector port 352 (FIG. 9) which in turn provides AC power to motor 370 via cable 432 (FIGS. 7, 8) interconnected between three phase ports 350 and motor 370. As mentioned above, one or more chargers 310 are positioned in the front portion of the vehicle 100 and recharge battery groups 304A, 304B.

While this invention has been described as having an exemplary design, the present invention may be further modified within the spirit and scope of this disclosure. The application is, therefore, intended to cover any variations, uses, or adaptations of the invention using its general principles. Further, this application is intended to cover such departures from the present disclosure as come within known or customary practice in the art to which this invention pertains.

What is claimed is:

1. An electric vehicle, comprising:
   a frame having first and second ends and a seat supporting portion therebetween;
   a plurality of ground engaging members supporting the frame;
   a plurality of batteries supported by the frame intermediate the first and second ends and divided into a plurality of groups of batteries leaving at least one longitudinal opening therebetween;
   an electronic controller mounted transversely in the longitudinal opening;
   a first differential supported by the frame adjacent the first end;
   a second differential supported by the frame adjacent the second end;
   an electric motor supported by the frame adjacent the first end and operatively connected to the first differential; and
   a prop shaft operatively connected to the motor and extending through the longitudinal opening and operatively connected to the second differential.

2. The vehicle of claim 1, wherein the first end is a rear end of the vehicle frame.

3. The vehicle of claim 1, further comprising a transaxle connected to the motor having a rearwardly directed drive operatively connected to the first differential and a forwardly directed drive operatively connected to the prop shaft.

4. The vehicle of claim 1, wherein the frame is comprised of plural longitudinally extending frame members, and the seat supporting portion is comprised of plural crossbars extending laterally across, and elevated from, the frame members, the electronic controller is mounted to the crossbars and extends downwardly into the longitudinal opening.

5. The vehicle of claim 4, wherein the groups of batteries are connected to each other in parallel and the batteries within each group are serially connected to each other.

6. The vehicle of claim 5, wherein the batteries are separated into two groups of batteries and the longitudinal opening is positioned generally centrally relative to the lateral width of the vehicle.

7. The vehicle of claim 5, wherein the batteries are electrically connected to the electronic controller and of the electrical connections to and from the electronic controller are made to one face of the electronic controller.

8. The vehicle of claim 1, further comprising a seat bottom support, wherein the batteries are positioned with the seat supporting portion and the seat bottom support is positioned over the seat supporting portion and over the batteries.

9. An electric vehicle, comprising:
   a frame having a front end and a rear end;
   a plurality of batteries supported by the frame;
   an electric motor mounted adjacent a rear end of the frame;
   a rear differential mounted adjacent a rear end of the frame and operatively connected to the electric motor; and
   a front differential and overrunning clutch operatively connected to the electric motor.

10. The electric vehicle of claim 9, wherein the overrunning clutch engages when the front differential slips by a predetermined percentage.

11. The electric vehicle of claim 10, wherein the predetermined percentage is between 10%-30%.

12. The electric vehicle of claim 9, wherein the motor is an AC motor.

13. The electric vehicle of claim 9, wherein the plurality of batteries are divided into two groups leaving a center longitudinal opening therebetween, the two groups of batteries are connected to each other in parallel and the batteries within each group are serially connected to each other.

14. The electric vehicle of claim 13, wherein each group of batteries is comprised of four-twelve volt batteries.

15. An all wheel drive electric vehicle, comprising:
    a frame having first and second ends;
    a plurality of ground engaging members supporting the frame;
    first and second drive linkages positioned proximate the first and second ends and operatively connected to ground engaging members at the first and second ends;
    a motor attached to the frame first end and operatively connected to the first and second drive linkages; and
    a plurality of batteries supported by the frame intermediate the first and second ends, the batteries defining a plurality of groups of batteries electrically connected in parallel and the individual batteries within each group being electrically connected in series.

16. The electric vehicle of claim 15, wherein the groups of batteries define at least one center longitudinal opening therebetween.

17. The electric vehicle of claim 16, further comprising an electronic controller mounted in the center longitudinal opening.

18. The vehicle of claim 15, wherein the frame is comprised of plural longitudinally extending frame members and the seat supporting portion is comprised of plural crossbars extending laterally across, and elevated from, the frame members.

19. The electric vehicle of claim 18, wherein the frame further comprises a support shelf positioned on the longitudinally extending frame members, and the plurality of batteries are supported by the support shelf.

20. The electric vehicle of claim 19, wherein further comprising a seat bottom positioned over the plurality of batteries.

21. An all wheel drive electric vehicle, comprising:
    a frame having first and second ends;
    a plurality of ground engaging members supporting the frame;
    first and second drive linkages positioned proximate the first and second ends and operatively connected to ground engaging members at the first and second ends;
    a motor attached to the frame first end and operatively connected to the first and second drive linkages;
    a plurality of batteries supported by the frame intermediate the first and second ends, the batteries defining a plurality of groups of batteries electrically connected in parallel and the individual batteries within each group being electrically connected in series, the groups of batteries defining at least one center longitudinal opening therebetween; and an electronic controller mounted in the center longitudinal opening.

* * * * *